(12) United States Patent
Park et al.

(10) Patent No.: US 11,895,287 B2
(45) Date of Patent: Feb. 6, 2024

(54) ELECTRONIC DEVICE GENERATING MULTI-PLANE-IMAGE OF ARBITRARY VIEWPOINT AND OPERATING METHOD THEREOF

(71) Applicant: ELECTRONICS AND TELECOMMUNICATIONS RESEARCH INSTITUTE, Daejeon (KR)

(72) Inventors: Seongjin Park, Daejeon (KR); Do Hyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 53 days.

(21) Appl. No.: 17/513,362

(22) Filed: Oct. 28, 2021

(65) Prior Publication Data
US 2023/0071310 A1 Mar. 9, 2023

(30) Foreign Application Priority Data
Sep. 6, 2021 (KR) .......................... 10-2021-0118063

(51) Int. Cl.
*H04N 13/282* (2018.01)
*G06N 3/08* (2023.01)
(Continued)

(52) U.S. Cl.
CPC ............ *H04N 13/282* (2018.05); *G06N 3/08* (2013.01); *H04N 13/111* (2018.05); *H04N 13/246* (2018.05)

(58) Field of Classification Search
CPC ... H04N 13/111; H04N 13/218; G06V 10/751
See application file for complete search history.

(56) References Cited

U.S. PATENT DOCUMENTS 10,893,250 B2  1/2021  Kar et al.
2016/0335795 A1* 11/2016  Flynn ................ G06F 18/24137
(Continued)

FOREIGN PATENT DOCUMENTS

CN      106686377      9/2018
CN      110798673      3/2021

OTHER PUBLICATIONS

Im, et al., DPSNet: End-to-end Deep Plane Sweep Stereo, May 2019, ICLR Conference paper, p. 5 (Year: 2019).*
(Continued)

*Primary Examiner* — Jayanti K Patel
*Assistant Examiner* — Christopher Kingsbury Glover
(74) *Attorney, Agent, or Firm* — KILE PARK REED & HOUTTEMAN PLLC

(57) ABSTRACT

Disclosed are an electronic device generating a multi-plane image of an arbitrary viewpoint and an operating method thereof. The electronic device includes a memory that stores a plurality of images, and at least one processor that executes a machine learning-based multi-plane image generating module generating an image of an arbitrary viewpoint from the plurality of images stored in the memory. When the multi-plane image generating module is executed, the processor selects at least two images from the plurality of images, by performing geometric calibration on the plurality of images, calculates a plane sweep volume including at least two layer images, performs an operation of a deep neural network to generate a plurality of multi-plane images having probability values, and generates the image of the arbitrary viewpoint by composing the plurality of multi-plane images and stores the image of the arbitrary viewpoint in the memory.

13 Claims, 5 Drawing Sheets

(51) Int. Cl.
*H04N 13/111* (2018.01)
*H04N 13/246* (2018.01)

(56) References Cited

U.S. PATENT DOCUMENTS

| | | | |
|---|---|---|---|
| 2020/0228774 A1* | 7/2020 | Kar | H04N 13/111 |
| 2021/0012561 A1* | 1/2021 | Sunkavalli | G06T 7/55 |
| 2022/0139036 A1* | 5/2022 | Bertel | G06V 10/751 |
| | | | 345/418 |

OTHER PUBLICATIONS

John Flynn et al.; "DeepView: View synthesis with learned gradient descent"; Computer Vision and Pattern Recognition 2019; pp. 2367-2376.

* cited by examiner

ELECTRONIC DEVICE GENERATING MULTI-PLANE-IMAGE OF ARBITRARY VIEWPOINT AND OPERATING METHOD THEREOF

CROSS-REFERENCE TO RELATED APPLICATIONS

This application claims priority under 35 U.S.C. § 119 to Korean Patent Application No. 10-2021-0118063 filed on Sep. 6, 2021, in the Korean Intellectual Property Office, the disclosures of which are incorporated by reference herein in their entireties.

BACKGROUND

The present disclosure relates to an electronic device, and more particularly, relates to an electronic device generating a multi-plane image based on a given plenoptic image and generating an image of a viewpoint desired by a user through composition of multi-plane images and an operating method of the electronic device.

To generate an image of a viewpoint desired by a user, in general, there is used a way to reconstruct images (e.g., two-dimensional images) three-dimensionally. An image generating device may generate an image of a viewpoint desired by the user by calculating depth values of images by using images obtained from a stereo camera or a multi-camera, generating a three-dimensional mesh through the depth values, and applying a texture to the three-dimensional mesh.

However, the quality of the reconstructed result and the generated image may be affected depending on the quality of the calculated depth values. Accordingly, it may be difficult to calculate depth values accurately. In the case where the image generating device uses all the points of the image to generate the 3D mesh, the capacity of the three-dimensional mesh may become huge. For this reason, the image generating device may simplify the three-dimensional mesh. However, information loss may occur in the process of simplifying the three-dimensional mesh. Even though the image generating device applies the texture to the three-dimensional mesh, it may be difficult to express the lighting or reflection effects of images according to viewpoints.

SUMMARY

Embodiments of the present disclosure provide a technology for generating an image of a viewpoint desired by a user by creating a deep neural network model generating a multi-plane image, which is designed to have a probability value for a depth finally, by using actually photographed data rather than virtual data, designing a loss function by using the photographed data as a reference, and composing multi-plane images finally.

According to an embodiment of the present disclosure, an electronic device may include a memory that stores a plurality of images, and at least one processor that executes a machine learning-based multi-plane image generating module generating an image of an arbitrary viewpoint from the plurality of images stored in the memory. When the multi-plane image generating module is executed, the processor may select at least two images from the plurality of images, for each of the plurality of images, by performing geometric calibration on the plurality of images, may calculate a plane sweep volume including at least two layer images corresponding to at least two depth layers for each of the plurality of images, by using the at least two selected images and a result of the geometric calibration, may perform an operation of a deep neural network, which uses a softmax function as an activation function, on each of the at least two depth layers of the calculated plane sweep volume, for each of the plurality of images, to generate a plurality of multi-plane images having probability values respectively corresponding to the at least two depth layers thus calculated, and may generate the image of the arbitrary viewpoint by composing the plurality of multi-plane images thus generated and may store the image of the arbitrary viewpoint in the memory.

In the electronic device according to an embodiment of the present disclosure, the plurality of images may be images photographed by cameras having different internal parameters.

In the electronic device according to an embodiment of the present disclosure, to perform the operation of the deep neural network, which uses the softmax function as the activation function, on each of the at least two depth layers of the calculated plane sweep volume, for each of the plurality of images, may include rearranging the at least two layer images of the calculated plane sweep volume based on the at least two depth layers.

In the electronic device according to an embodiment of the present disclosure, in each of the plurality of images, the at least two images may be selected based on a geometric distance associated with each of the plurality of images.

In the electronic device according to an embodiment of the present disclosure, the processor may further calculate a loss function for learning, which is based on the machine learning, by using one of the at least two images and the image of the arbitrary viewpoint.

In the electronic device according to an embodiment of the present disclosure, the processor may allow each of the one of the at least two images and the image of the arbitrary viewpoint to pass through a VGG network and may calculate, as the loss function, a square of a difference of result values before passing through a max pooling layer of the VGG network.

In the electronic device according to an embodiment of the present disclosure, the deep neural network may be based on a convolutional neural network.

According to an embodiment of the present disclosure, an operating method of an electronic device which generates a multi-plane image of an arbitrary viewpoint may include reading a plurality of images of a plenoptic image from a memory of the electronic device, selecting, by at least one processor of the electronic device, at least two images from the plurality of images, for each of the plurality of images, by performing geometric calibration on the plurality of images, calculating, by the at least one processor, a plane sweep volume including at least two layer images corresponding to at least two depth layers by using the at least two images and a result of the geometric calibration, for each of the plurality of images, performing, by the at least one processor, an operation of a deep neural network, which uses a softmax function as an activation function, on each of the at least two depth layers of the calculated plane sweep volume, for each of the plurality of images, to generate a plurality of multi-plane images having probability values respectively corresponding to the at least two depth layers thus calculated, and generating, by the at least one processor, the image of the arbitrary viewpoint by composing the plurality of multi-plane images thus generated and storing the image of the arbitrary viewpoint in the memory.

In the operating method of the electronic device according to an embodiment of the present disclosure, the generating of the plurality of multi-plane images may include performing, by the at least one processor, the operation of the deep neural network to calculate weights and an alpha value of each of the at least two depth layers.

In the operating method of the electronic device according to an embodiment of the present disclosure, each of the at least two depth layers may include at least two color channel layers, and the calculated weights and the calculated alpha value may be applied to each of the at least two color channel layers.

In the operating method of the electronic device according to an embodiment of the present disclosure, the deep neural network may be trained to generate the plurality of multi-plane images by using images actually photographed as the plurality of images.

The operating method of the electronic device according to an embodiment of the present disclosure may further include calculating, by the at least one processor, a loss function for learning of the deep neural network based on the actually photographed images and the generated image of the arbitrary viewpoint, and storing the calculated loss function in the memory.

The operating method of the electronic device according to an embodiment of the present disclosure may further include training, by the at least one processor, the deep neural network based on the calculated loss function.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Figure 1:
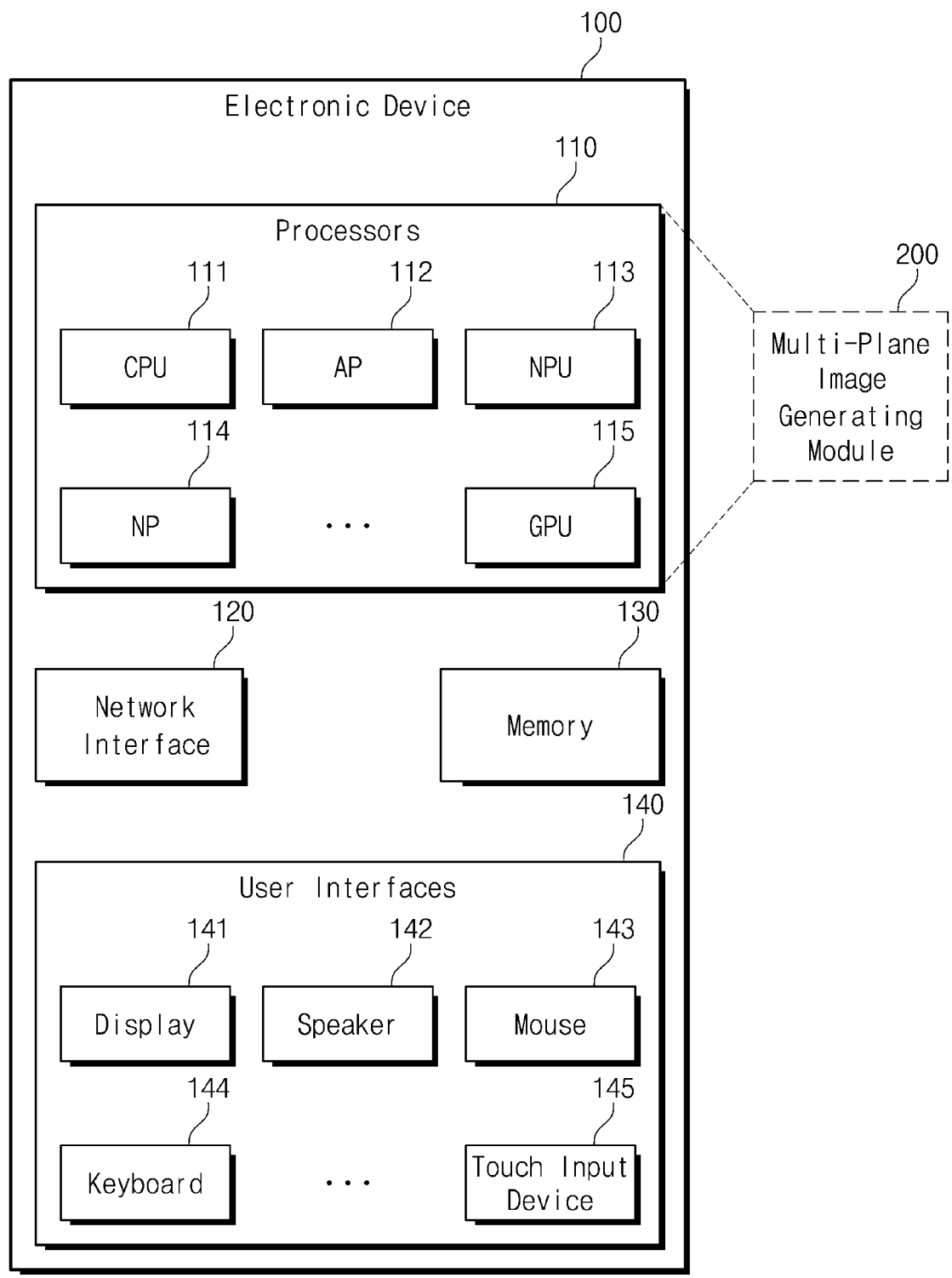
FIG. 1 illustrates a block diagram of an electronic device, according to an embodiment of the present disclosure.

FIG. 1 is a block diagram illustrating an electronic device 100 according to an embodiment of the present disclosure. Referring to FIG. 1, the electronic device 100 may include a multi-plane image generating module 200, a memory 130, processors 110, and a network interface 120.

The processors 110 may function as a central processing unit of the electronic device 100. At least one of the processors 110 may drive the multi-plane image generating module 200. The processors 110 may include at least one general-purpose processor such as a central processing unit (CPU) 111 or an application processor (AP) 112. Also, the processors 110 may further include at least one special-purpose processor such as a neural processing unit (NPU) 113, a neuromorphic processor 114, or a graphics processing unit (GPU) 115. The processors 110 may include two or more homogeneous processors. For another example, the at least one processor (or at least another processor) of the processors 110 may be manufactured to implement various machine learning or deep learning modules.

At least one of the processors 110 may be used to train the multi-plane image generating module 200. At least one of the processors 110 may train the multi-plane image generating module 200 based on various data or information.

At least one (or at least another) of the processors 110 may execute the multi-plane image generating module 200. The multi-plane image generating module 200 may generate a multi-plane image, based on the machine learning or deep learning. For example, the multi-plane image generating module 200 may be implemented in the form of instructions (or codes) that are executed by at least one of the processors 110. In this case, the at least one processor may load the instructions (or codes) of the multi-plane image generating module 200 onto the memory 130.

For another example, at least one (or at least another) processor of the processors 110 may be manufactured to implement the multi-plane image generating module 200. For example, the at least one processor may be a dedicated processor that is implemented hardwarely based on the multi-plane image generating module 200 generated by the learning of the multi-plane image generating module 200.

For another example, the at least one processor (or at least another processor) of the processors 110 may be manufactured to implement various machine learning or deep learning modules. The at least one processor may implement the multi-plane image generating module 200 by receiving information (e.g., instructions or codes) corresponding to the multi-plane image generating module 200.

The network interface 120 may provide remote communication with an external device. The network interface 120 may perform wireless or wired communication with the external device. The network interface 120 may communicate with the external device through at least one of various communication schemes such as Ethernet, wireless-fidelity (Wi-Fi), long term evolution (LTE), and 5G mobile communication. For example, the network interface 120 may communicate with the external device of the electronic device 100.

The network interface 120 may receive data to be processed by the electronic device 100 from the external device. The network interface 120 may output result data generated by the electronic device 100 to the external device. For example, the network interface 120 may store the result data in the memory 130.

The memory 130 may store data and program codes that are processed by the processors 110 or are scheduled to be processed by the processors 110. For example, in some embodiments, the memory 130 may store data input to the electronic device 100 or data generated or trained while the deep neural network is driven by the processors 110. For example, the memory 130 may store images input to the electronic device 100.

For example, under control of the processors 110, the memory 130 may store a result of performing geometric calibration on the images input to the electronic device 100. Also, the memory 130 may store a plane sweep volume calculated under control of the processors 110 and multi-plane images generated through the deep neural network. For another example, the memory 130 may store a loss function calculated from an image of an arbitrary viewpoint.

Also, the memory 130 may be used as a main memory of the electronic device 100. The memory 130 may include a dynamic random access memory (DRAM), a static RAM (SRAM), a phase-change RAM (PRAM), a magnetic RAM (MRAM), a ferroelectric RAM (FeRAM), a resistive RAM (RRAM), or the like.

User interfaces 140 may receive information from a user and may provide information to the user. The user interfaces 140 may include at least one user output interface such as a display 141 or a speaker 142, and at least one user input interface such as a mouse 143, a keyboard 144, or a touch input device 145. The multi-plane image generating module 200 may include a plane sweep volume generating unit and a multi-plane image generating unit. The plane sweep volume generating unit and the multi-plane image generating unit may be a portion of a computation (or operation) space. In this case, the plane sweep volume generating unit and the multi-plane image generating unit may be implemented in the form of firmware or software. For example, the firmware may be stored in the memory 130 and may be loaded and executed by the processors 110.

Under control of the processors 110, the plane sweep volume generating unit may perform geometric calibration and may determine transform parameters from the input images. Also, the plane sweep volume generating unit may calculate a plane sweep volume by using a geometric calibration result. The multi-plane image generating unit may perform a deep neural network operation under control of the processors 110 and may generate a multi-plane image by using the plane sweep volume.

For example, under control of the processors 110, the network interface 120 may store element images of a plenoptic image received from the external device in the memory 130. Under control of the processors 110, the multi-plane image generating module 200 may select some of the element images stored in the memory 130 for the multi-plane image generating module 200.

Under control of the processors 110, the multi-plane image generating module 200 or any other module driven by the processors 110 may calculate a loss function for learning by using an arbitrary element image and an image of an arbitrary viewpoint generated based on the element image. Also, the multi-plane image generating module 200 or the module driven by the processors 110 may train (or may retrain or additionally train) the deep neural network based on the loss function.

Unlike the illustration of FIG. 1, the plane sweep volume generating unit and the multi-plane image generating unit may be implemented with separate hardware for generating a multi-plane image of an arbitrary viewpoint. For example, the plane sweep volume generating unit and the multi-plane image generating unit may be implemented with a neuromorphic chip for generating a multi-plane image of arbitrary viewpoint through artificial neural network-based learning or may be implemented with a dedicated logic circuit such as a field programmable gate arrays (FPGA) or an application specific integrated circuit (ASIC).

Figure 2:
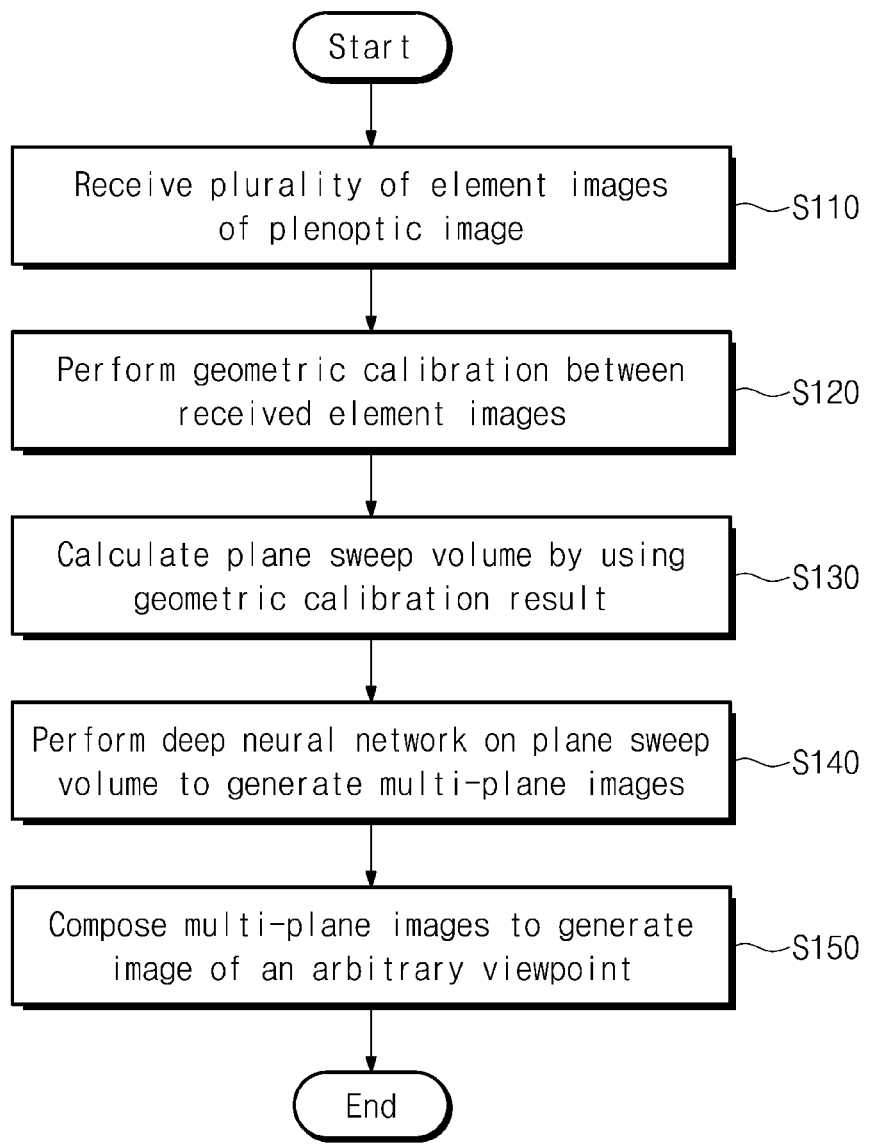
FIG. 2 is a flowchart illustrating a method in which an electronic device generates a multi-plane image, according to an embodiment of the present disclosure.

FIG. 2 is a flowchart illustrating a method in which an electronic device generates a multi-plane image, according to an embodiment of the present disclosure. Referring to FIGS. 1 and 2, the electronic device 100 may perform operation S110 to operation S150.

In operation S110, the electronic device 100 may receive a plurality of element images of a plenoptic image. For example, the plenoptic image may be an image obtained by using one camera. Alternatively, the plenoptic image may be an image obtained by using a plurality of cameras having different internal parameters or different kinds of cameras. The plenoptic image may be an actually photographed image. The electronic device 100 may receive the plurality of element images through the network interface 120 under control of the processors 110. Also, the memory 130 may store the plurality of element images received through the network interface 120. The electronic device 100 may read the plurality of element images stored in the memory 130, under control of the processors 110.

In operation S120, the multi-plane image generating module 200 driven by the processors 110 may perform geometric calibration between the plurality of element images thus received. For example, the multi-plane image generating module 200 may perform the geometric calibration between the plurality of electronic device 100 input to the electronic device 100. The processors 110 may select at least two images for each of the plurality of element images thus received, by performing the geometric calibration.

For example, the multi-plane image generating module 200 (e.g., the plane sweep volume generating unit) driven by the processors 110 may select an arbitrary element image "i" (i being a positive integer of 1 or more and M or less) from the plurality of element images and may select "N" images (N being a positive integer of 1 or more and M or less) geometrically close to the selected element image "i". Alternatively, the processors 110 may select at least two images "i" and "j" (j being a positive integer of 1 or more and M or less) from the plurality of element images and may select "N" element images i1, i2 . . . iN geometrically close to the selected image "i" and "N" element images j1, j2 . . . jN geometrically close for the selected image "j".

The multi-plane image generating module 200 (e.g., the plane sweep volume generating unit) driven by the processors 110 may determine information about a depth for each of the plurality of element images thus input, by performing the geometric calibration. For example, the multi-plane image generating module 200 may determine a depth value "L" and transform parameters, for each of the plurality of element images thus input, by performing the geometric calibration. The depth value "L" may mean the number of depth layers. Also, the number of transform parameters may correspond to the depth value "L" thus determined. The transform parameters may be values given from the depth layers, respectively. The transform parameters may respectively change depending on the depth layers.

In operation S130, the multi-plane image generating module 200 (e.g., the plane sweep volume generating unit) driven by the processors 110 may calculate a plane sweep volume by using a result of the geometric calibration performed in operation S120. For example, the multi-plane image generating module 200 may calculate a plane sweep volume having at least two depth layers by using the at least two selected images and the geometric calibration result.

For example, the multi-plane image generating module 200 may calculate the plane sweep volume by using the N element images geometrically closed to the arbitrary selected element image "i" and the geometric calibration result.

In operation S140, the multi-plane image generating module 200 driven by the processors 110 may generate a plurality of multi-plane images by performing an operation (or inference) of the deep neural network on the plane sweep volume. For example, the multi-plane image generating module 200 may generate a plurality of multi-plane images having probability values respectively corresponding to the at least two depth layers through the deep neural network, which uses a softmax function as an activation function, for each of the depth layers of the plane sweep volume.

For example, the deep neural network may be a deep neural network based on a convolutional neural network. The multi-plane image generating module 200 may rearrange layer images based on a depth layer, in the plane sweep volume. For example, the multi-plane image generating module 200 may rearrange layer images based on each of the depth layers and may perform an operation (or inference) of the deep neural network on the rearranged layer images.

In operation S150, the processors 110 may generate an image of an arbitrary viewpoint by composing the plurality of multi-plane images thus generated. For example, in response to a demand of the user, the user interfaces 140 (e.g., the display 141) of the electronic device 100 may provide the image of the arbitrary viewpoint to the user, under control of the processors 110. The multi-plane image generating module 200 driven by the processors 110 or any other module driven by the processors 110 may calculate a loss function for learning by using the image of the arbitrary viewpoint and the actually photographed data.

Figure 3:
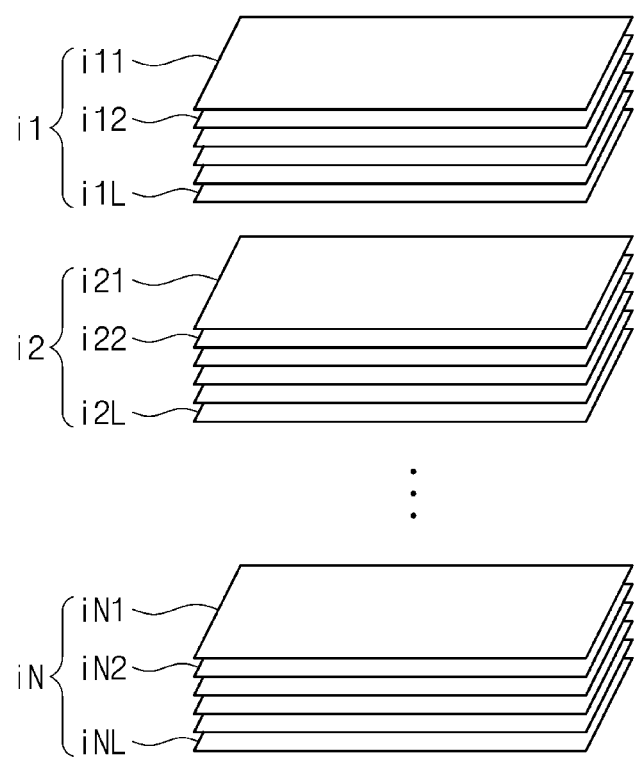
FIG. 3 illustrates an example of a plane sweep volume in detail.

FIG. 3 illustrates an example of a plane sweep volume. Referring to FIG. 3, a plane sweep volume PSV may include N element images i1, i2 . . . iN, and each of the N element images i1, i2 . . . iN may include L depth layers i11 to i1L, i21 to i2L, or iN1 to 1NL. For example, the multi-plane image generating module 200 driven by the processors 110 may generate a plane sweep volume including L depth layers with respect to one element image ik (1≤k≤N) of the N element images i1 to iN geometrically closed to an arbitrary element image "i", by using transform parameters, the number of which corresponds to the depth value "L".

The multi-plane image generating module 200 may generate "N*L" layer images with respect to the arbitrary element image "i". In this case, each of the layer images may include 3-channel, that is, R, G, and B images. Accordingly, an "N*L*3-channel" tensor may be generated with respect to the arbitrary element image "i".

Figure 4:
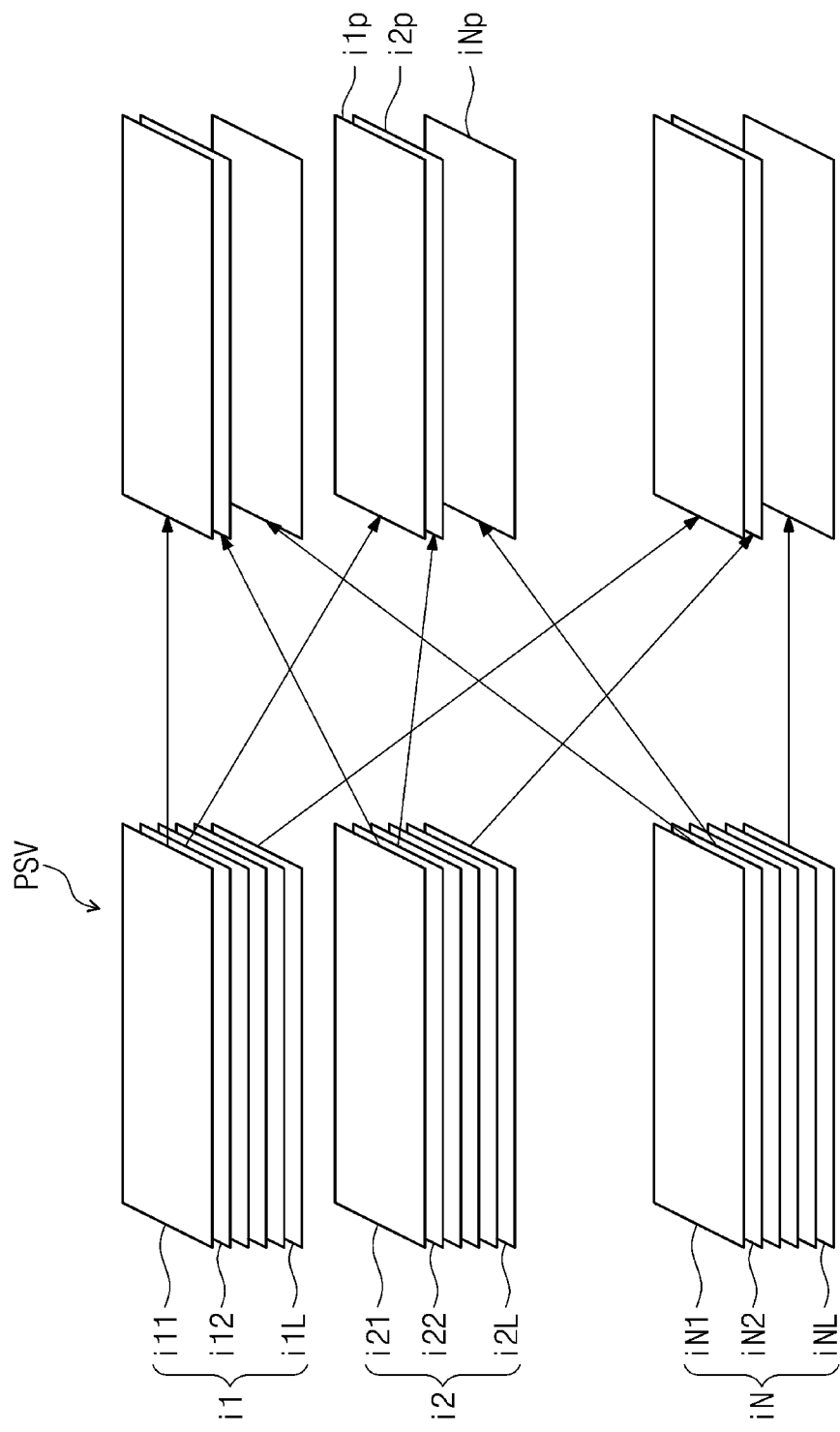
FIG. 4 illustrates an example of rearranging layer images before performing a deep neural network operation on a plane sweep volume.

FIG. 4 illustrates an example of rearranging layer images before performing a deep neural network operation on a plane sweep volume. Referring to FIGS. 3 and 4, the multi-plane image generating module 200 driven by the processors 110 may rearrange the layer images generated from the arbitrary element image "i", based on the same depth layer, before driving the deep neural network with regard to the plane sweep volume. For example, the multi-plane image generating module 200 may rearrange the layer images i11, i12 . . . i1N, i21, i22 . . . i2L, iN1, IN2 . . . INL generated from the element images i1, i2 . . . iN geometrically close to the arbitrary element image "i", based on a depth layer. In this case, N layer images i1p, i2p . . . iNp may be rearranged with respect to an arbitrary depth layer "p" (1≤p≤L). Also, each of the layer images associated with the arbitrary depth layer "p" may include three channels, that is, R, G, and B channels, and images associated with the arbitrary depth layer "p" may generate a "N*3-channel" tensor.

Figure 5:
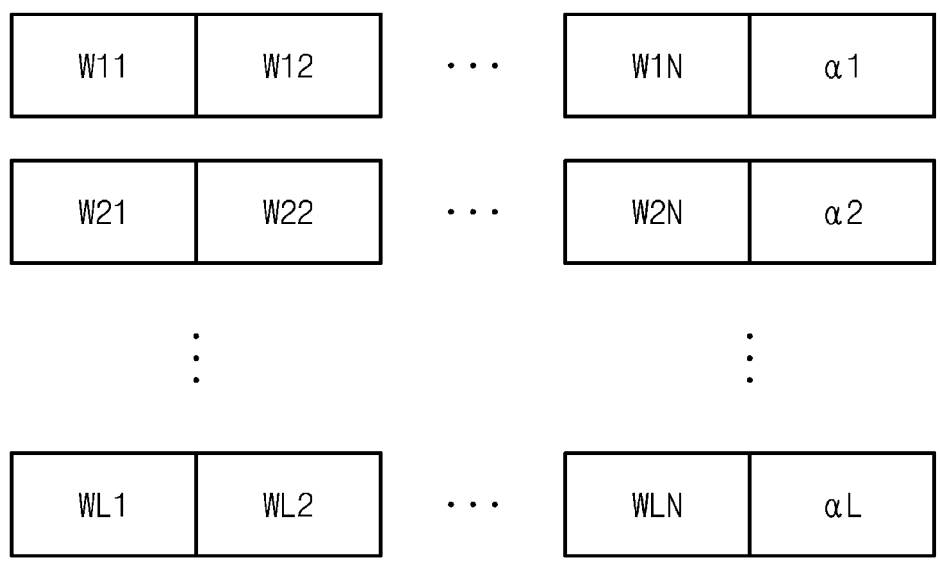
FIG. 5 illustrates an example in which weights and alpha values of depth layers are generated through a deep neural network, according to an embodiment of the present disclosure.

FIG. 5 illustrates an example in which weights and alpha values of depth layers are generated through a deep neural network, according to an embodiment of the present disclosure. Referring to FIGS. 3, 4, and 5, the multi-plane image generating module 200 (e.g., the multi-plane image generating unit) driven by the processors 110 may calculate weights and alpha values of the layer images by performing the deep neural network operation on each depth layer of the plane sweep volume. For example, when the N layer images i1p, i2p . . . iNp rearranged with respect to the arbitrary depth layer "p" are input to the deep neural network, (N+1) channels having N weights and one alpha value are calculated. For example, the multi-plane image generating module 200 may calculate an alpha value by using color channels. A color channel $C_l$ of an i-th layer (1≤l≤L) of a multi-plane image may be calculated based on Equation 1 as follows.

$$C_l = \sum_{n=1}^{N} w_{l,n} \times I_{n,l} \quad \text{[Equation 1]}$$

In this case, $I_{n,l}$ may means an l-th layer image of an n-th element image, $w_{l,n}$ may mean an n-th weight of the output depth layer "l". Also, an alpha value corresponding to the color channel $C_l$ may be calculated by a softmax function of Equation 2.

$$A_i = \frac{e^{a_i}}{\sum_{k=1}^{L} e^{a_i}} \quad \text{[Equation 2]}$$

For example, with regard to the arbitrary element image "l", by performing rendering on a multi-plane image, in which a color channel and an alpha value are calculated, through alpha blending like the following equation, the multi-plane image generating module 200 may obtain an image l' of the same position as a viewpoint of the arbitrary element image "l" based on Equation 3.

$$I' = \frac{\sum_{k=1}^{L} C_i \times A_i}{\sum_{k=1}^{L} A_i} \quad \text{[Equation 3]}$$

The multi-plane image generating module 200 or any other module driven by the processors 110 may calculate a loss function for learning by using the arbitrary element image "l" and the obtained image l'. For example, the multi-plane image generating module 200 or any other module driven by the processors 110 may allow each of the arbitrary element image "l" and the obtained image l' to pass through a VGG network such that the loss function for learning is calculated by using the square of a difference of result values immediately before passing a max pooling layer.

For another example, the multi-plane image generating module 200 or any other module driven by the processors 110 may calculate the loss function for learning by using an image of an arbitrary viewpoint generated by composing actually photographed data and a plurality of multi-plane images. In this case, the actually photographed data may be data photographed by using one camera. For example, the actually photographed data may be data photographed by using a plurality of cameras having different internal parameters or different kinds of cameras.

Also, the multi-plane image generating module 200 or any other module driven by the processors 110 may store the calculated loss function in the memory 130 or may output the calculated loss function to the external device through the network interface 120. For example, the multi-plane image generating module 200 or any other module driven by the processors 110 may read the loss function stored in the memory 130 and may train the multi-plane image generating module 200 based on the loss function.

An electronic device according to an embodiment of the present disclosure uses a softmax activation function in the last output layer of the deep neural network. Accordingly, the quality of the final multi-plane image is improved. Also, a sum of a depth axis of alpha values of the multi-plane image is determined as "1", and an alpha value is used as a probability value of a depth. The electronic device according to an embodiment of the present disclosure may train a model based on an actually photographed image, not virtually generated composition data. The present disclosure may generate a multi-plane image even in multiple cameras having different internal parameters or different kinds of cameras.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a memory configured to store a plurality of images; and
at least one processor configured to execute a machine learning-based multi-plane image generating module generating an image of an arbitrary viewpoint from the plurality of images stored in the memory,
wherein, when the multi-plane image generating module is executed, the processor is configured to:
select a first image from the plurality of images as a reference;
select at least two overlapping images from the plurality of images by performing geometric calibration on the plurality of images using the reference;
calculate a plane sweep volume including at least two layer images corresponding to at least two depth layers for each of the plurality of images, by using the at least two selected images and a result of the geometric calibration;
perform an operation of a deep neural network, which uses a softmax function as an activation function, on each of the at least two depth layers of the calculated plane sweep volume, for each of the plurality of images, to generate a plurality of multi-plane images having probability values respectively corresponding to the at least two depth layers thus calculated, and
generate the image of the arbitrary viewpoint by composing the plurality of multi-plane images thus generated and store the image of the arbitrary viewpoint in the memory.

2. The electronic device of claim 1, wherein the plurality of images are images photographed by cameras having different internal parameters.

3. The electronic device of claim 1, wherein to perform the operation of the deep neural network, which uses the softmax function as the activation function, on each of the at least two depth layers of the calculated plane sweep volume, for each of the plurality images, further includes:
rearranging the at least two layer images of the calculated plane sweep volume based on the at least two depth layers.

4. The electronic device of claim 1, wherein, in each of the plurality of images, the at least two images are selected based on a geometric distance associated with each of the plurality of images.

5. The electronic device of claim 1, wherein the processor is further configured to:
calculate a loss function for learning, which is based on the machine learning, by using one of the at least two mages and the image of the arbitrary viewpoint.

6. The electronic device of claim 5, wherein the processor allows each of the one of the at least two images and the image of the arbitrary viewpoint to pass through a VGG network and calculates, as the loss function, a square of a difference of result values before passing through a max pooling layer of the VGG network.

7. The electronic device of claim 1, wherein the deep neural network is based on a convolutional neural network.

8. An operating method of an electronic device which generates an image of an arbitrary viewpoint, the method comprising:
reading a plurality of images impinging a plenoptic image from a memory of the electronic device;
selecting, by at least one processor of the electronic device, a first image from the plurality of images as a reference;
selecting, by the at least one processor of the electronic device, at least two overlapping images from the plurality of element images by performing geometric calibration on the plurality of images using the reference;
calculating, by the at least one processor, a plane sweep volume including at least two layer images corresponding to at least two depth layers for each of the plurality of images, by using the at least two selected images and a result of the geometric calibration.;
performing, by the at least one processor, an operation of a deep neural network, which uses a softmax function as an activation function, on each of the at least two depth layers of the calculated plane sweep volume, for each of the plurality of images, to generate a plurality of multi-plane images having probability values respectively corresponding to the at least two depth layers thus calculated; and
generating, by the at least one processor, the image of the arbitrary viewpoint by composing the plurality of multi-plane images thus generated and storing the image of the arbitrary viewpoint in the memory.

9. The method of claim 8, wherein the generating of the plurality of multi-plane images further includes:
performing, by the at least one processor, the operation of the deep neural network to calculate weights and an alpha value of each of the at least two depth layers.

10. The method of claim 9, wherein each of the at least two depth layers includes at least two color channel layers, and
wherein the calculated weights and the calculated alpha value are applied to each of the at least two color channel layers.

11. The method of claim 8, wherein the deep neural network is trained to generate the plurality of multi-plane images by using images actually photographed as the plurality of element images.

12. The method of claim 11, further comprising:
calculating, by the at least one processor, a loss function for learning of the deep neural network based on the actually photographed images and the generated image of the arbitrary viewpoint; and
storing the calculated loss function in the memory.

13. The method of claim 12, further comprising:
training, by the at least one processor, the deep neural network based on the calculated loss function.

\* \* \* \* \*